(12) United States Patent
Luo

(10) Patent No.: US 12,385,477 B2
(45) Date of Patent: Aug. 12, 2025

(54) AIR PUMP DEVICE WITH BLUETOOTH FUNCTION

(71) Applicant: Huaxin (Dongguan) Technology Co., Ltd., Dongguan (CN)

(72) Inventor: Renlan Luo, Dongguan (CN)

(73) Assignee: Huaxin (Dongguan) Technology Co., Ltd., Dongguan (CN)

( * ) Notice: Subject to any disclaimer, the term of this patent is extended or adjusted under 35 U.S.C. 154(b) by 0 days.

(21) Appl. No.: 19/026,359

(22) Filed: Jan. 17, 2025

(65) Prior Publication Data

US 2025/0215880 A1    Jul. 3, 2025

(30) Foreign Application Priority Data

Jan. 14, 2025   (CN) .......................... 202520086793.7

(51) Int. Cl.
  *F04D 25/06*   (2006.01)
  *H04W 4/80*   (2018.01)
(52) U.S. Cl.
  CPC .............. *F04D 25/06* (2013.01); *H04W 4/80* (2018.02)

(58) Field of Classification Search
  CPC ....................................................... F04D 25/06
  See application file for complete search history.

(56) References Cited

U.S. PATENT DOCUMENTS 11,891,025 B2 *  2/2024  Brown ................... B60S 5/046

FOREIGN PATENT DOCUMENTS

CN            215333414 U   * 12/2021

* cited by examiner

*Primary Examiner* — Sabbir Hasan
(74) *Attorney, Agent, or Firm* — Murray, Ziel & Johnston; Aaron Powell

(57) ABSTRACT

An air pump device with bluetooth function comprises a case body, which is provided with an air pump, a control mainboard, a detection module and a power supply module inside; the control mainboard is electrically connected to the air pump, the detection module and the power supply module; a bluetooth module is arranged on the control mainboard. Within an effective coverage range of bluetooth, users can connect a mobile terminal to the control mainboard. Users can observe the working condition of the air pump via a mobile terminal.

9 Claims, 5 Drawing Sheets

AIR PUMP DEVICE WITH BLUETOOTH FUNCTION

CROSS-REFERENCE TO RELATED APPLICATIONS

The present invention claims the benefit of Chinese Patent Application No. 2025200867937 filed on Jan. 14, 2025, the contents of which are hereby incorporated by reference.

TECHNICAL FIELD

The present invention belongs to the technical field of air pump devices and particularly relates to an air pump device with Bluetooth function.

TECHNICAL BACKGROUND

Car air pump is a kind of portable air pump device that can not only inflate car tires, but also meet the inflation needs of motorcycles, bicycles, balls, rubber boats, etc. The popular portable air pump on the market is favored for its small size and portability. The portable air pump can quickly replenish tire pressure when the tire is leaking or under-inflated to ensure driving safety.

However, it usually takes more than 20 minutes to inflate a tire by using a portable air pump. If users stay too close to the air pump for a long time, there may be safety risk. If users keep a certain safe distance from the air pump, they cannot observe the tire pressure on the display screen. Users fail to ensure a appropriate pressure level is reached.

Invention Content

In order to overcome the defects of the existing technology, the present invention provides an air pump device with Bluetooth function, which can be connected to a mobile terminal via Bluetooth to observe the working condition of the air pump, so as to ensure the personal safety of users.

The technical scheme adopted by the present invention for solving the technical problems is as follows:

An air pump device with Bluetooth function includes a case body, which is provided with an air pump, a control mainboard, a air pressure sensor and a power supply module inside; the control mainboard is electrically connected to the air pump, the air pressure sensor and the power supply module; a Bluetooth module is arranged on the control mainboard.

Further, the air pump device also includes function buttons arranged on the surface of the case body. The control mainboard is arranged below the function buttons. A plurality of sensor switches corresponding to the function buttons one by one are arranged on the control mainboard.

Further, the case body is provided with a charging port and a discharge port, and the charging port and the discharge port are both electrically connected to the control mainboard.

Further, the air pump includes a motor and fan blades which are connected to the output end of the motor.

Further, the case body is provided with vents, and the fan blades are arranged adjacent to the vents.

Further, the case body includes a top case and a bottom case. The top case is provided with an observation window. The top case and the bottom case are connected to form an inner cavity provided with a display panel inside. The display panel is electrically connected to the control mainboard and is located below the observation window.

Further, the inner cavity includes a first installment cavity and a second installment cavity. The power supply module is arranged in the first installment cavity. The air pump is arranged in the second installment cavity.

Further, the inner cavity further includes a third installment cavity provided with air pump accessories inside. The second installment cavity is arranged between the first installment cavity and the third installment cavity.

Further, a storage box is arranged on the outer periphery of the air pump accessories, and the storage box is slidably arranged in the third installment cavity. A first opening is arranged at one end of the third installment cavity, and the storage box can be pulled out along the first opening.

Further, a second opening is arranged at one end of the case body, and the air pump port of the air pump is exposed to the outer surface of the case body along the second opening.

The beneficial effects of the present invention:

The present invention provides an air pump device with Bluetooth function. A Bluetooth module is arranged on the control mainboard of the air pump device. Within an effective coverage range of Bluetooth, users can connect the mobile terminal to the control mainboard to observe the working condition of the air pump via the mobile terminal, which can ensure the personal safety of users.

DESCRIPTION OF MARKS IN FIGURES

1—case body; 11—top case; 111—observation window; 12—bottom case; 13—vent; 14—charging port; 15—discharge port; 16—first opening; 17—second opening; 18—function button; 19—first installment cavity; 191—second installment cavity; 192—third installment cavity;
2—air pump; 20—air pump port; 21—motor; 22—fan blade; 23—air pump accessory; 24—storage box;
3—control mainboard; 31—display panel;
4—power supply module.

DETAILED DESCRIPTION OF THE EMBODIMENTS

Below is a further detailed description of the present invention based on the figures.

The present embodiment only shows an explanation of the present invention, and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "above", "below", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct, and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

The present invention provides an air pump device with Bluetooth function. A Bluetooth module is arranged on the control mainboard of the air pump device. Within an effective coverage range of Bluetooth, users can connect the mobile terminal to the control mainboard to observe the working condition of the air pump via the mobile terminal, which can ensure the personal safety of users.

Figure 1:
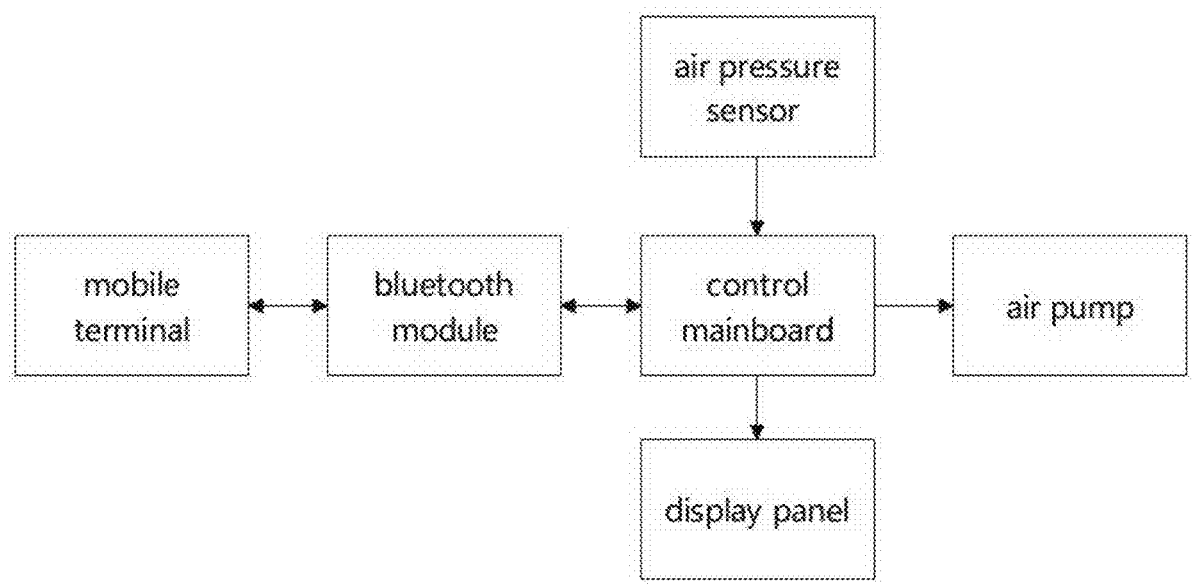
FIG. 1 is a principal diagram of an air pump device of the present invention.
Figure 2:
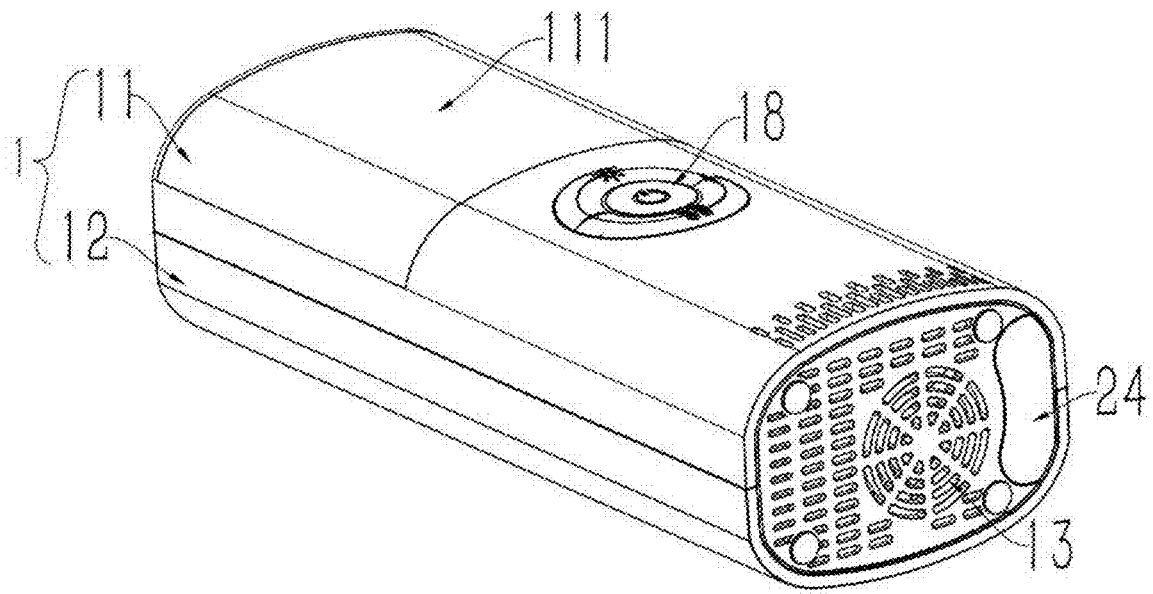
FIG. 2 is a schematic diagram of the air pump device of the present invention.
Figure 3:
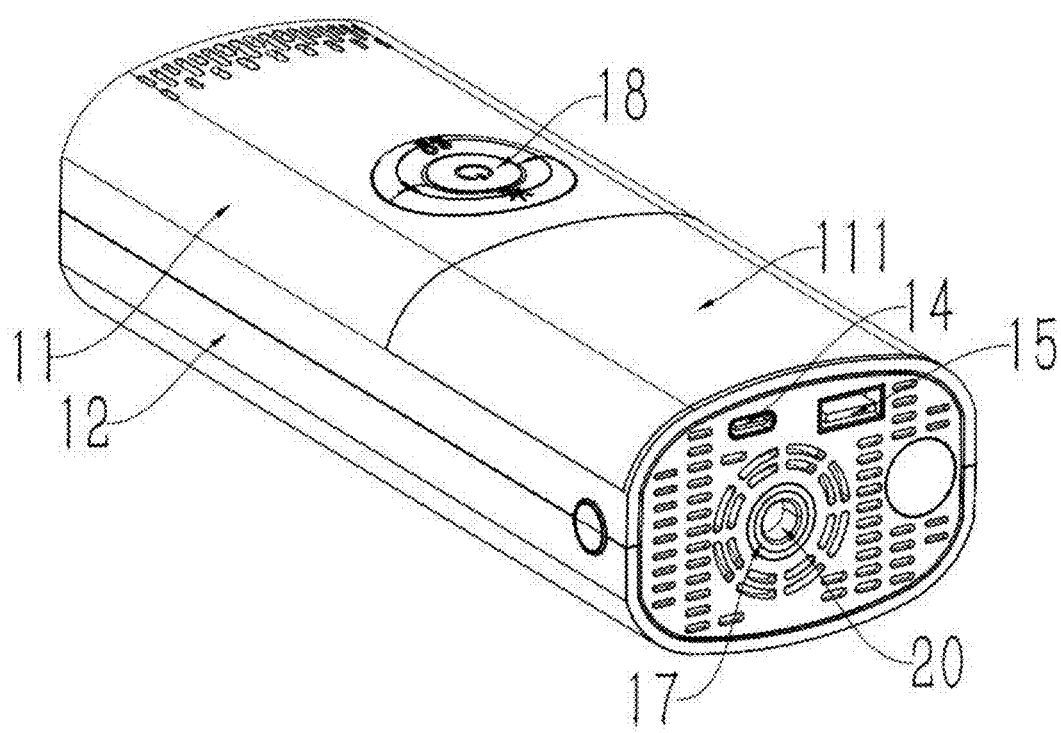
FIG. 3 is a schematic diagram of the air pump device of the present invention from another angle.
Figure 4:
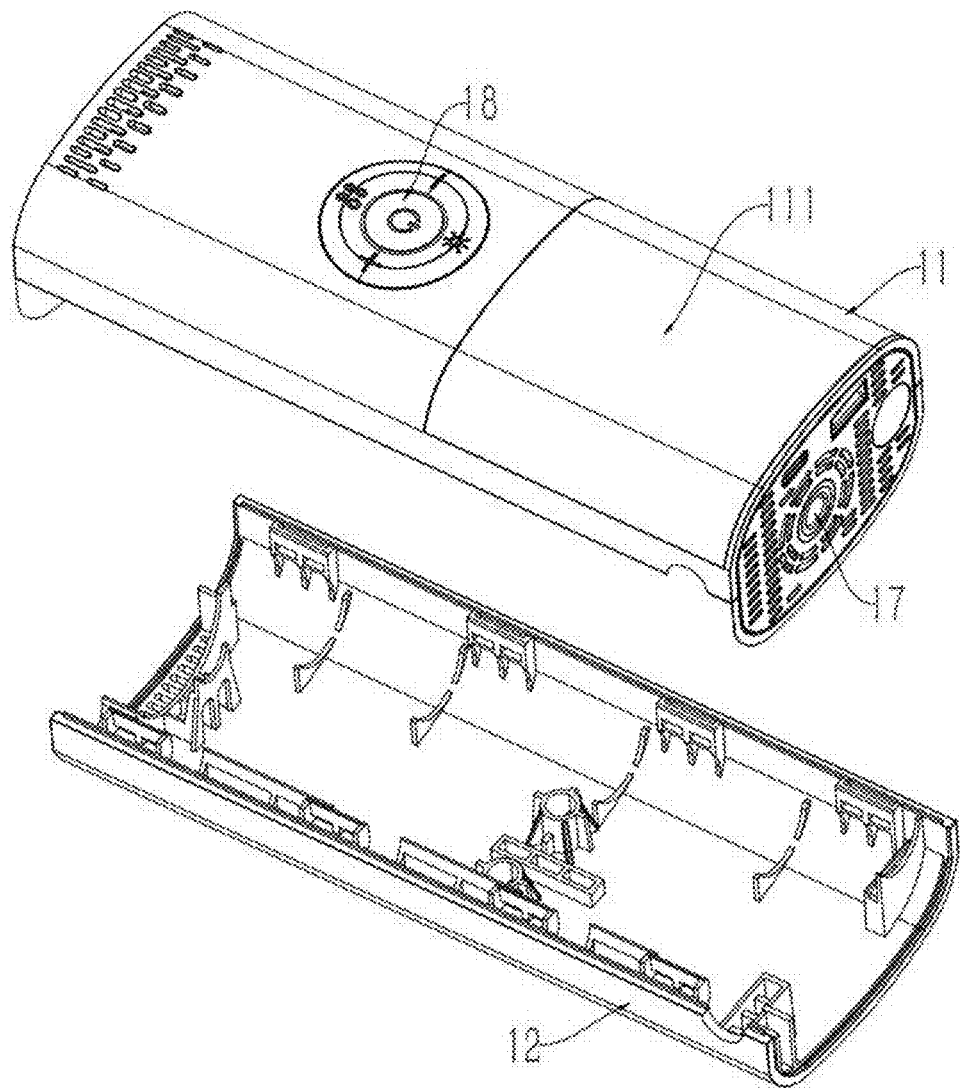
FIG. 4 is an exploded view of the case body of the air pump device of the present invention.
Figure 5:
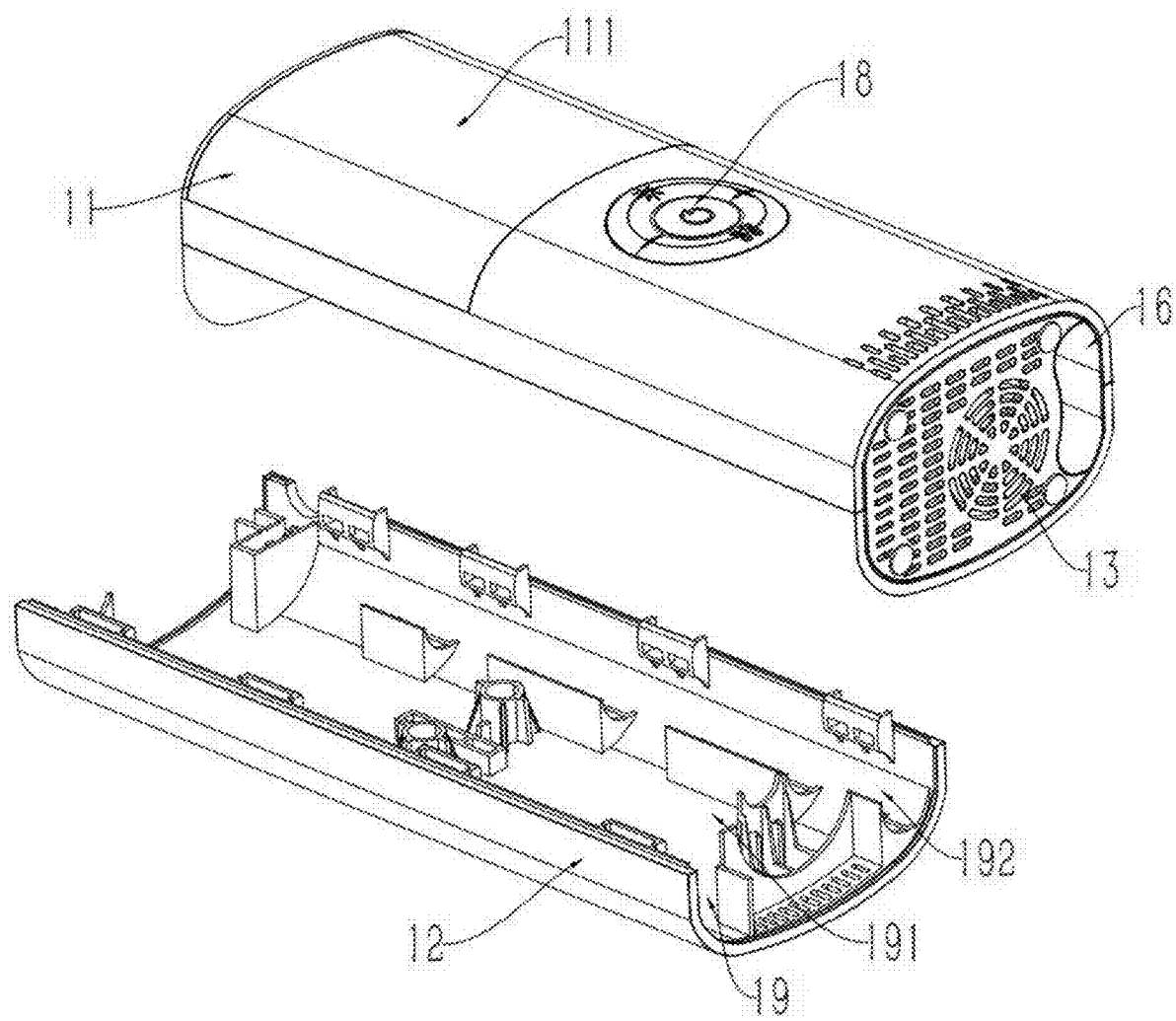
FIG. 5 is an exploded view of the case body of the air pump device of the present invention from another angle.
Figure 6:
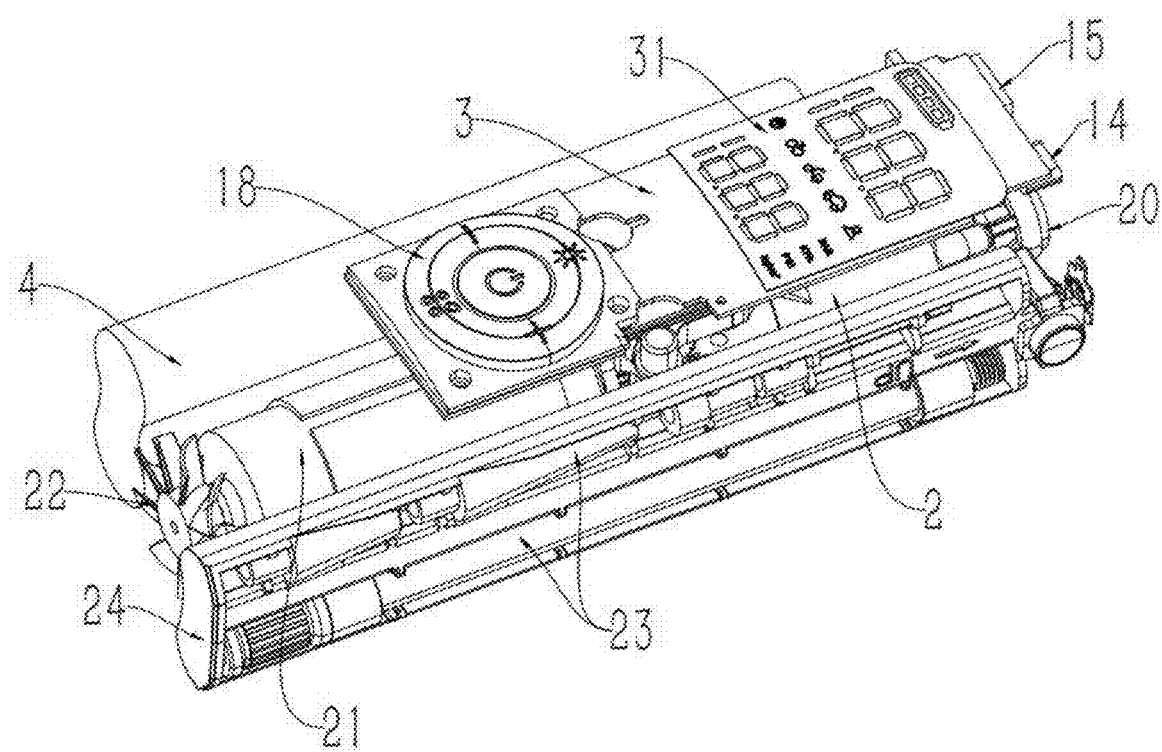
FIG. 6 is a schematic diagram of the air pump device of the present invention after removing the case.

Referring to FIGS. 1 to 6, this embodiment provides an air pump device with Bluetooth function, including a case body 1 which is provided with an air pump 2, air pump accessories 23, a control mainboard 3, a air pressure sensor and a power supply module 4. The control mainboard 3 is electrically connected to the air pump 2, the air pressure sensor and the power supply module 4, and a Bluetooth module is arranged on the control mainboard 3.

Understandably, the control mainboard 3 can be connected to the mobile terminal via a Bluetooth module. The mobile terminal here can be a portable device such as a mobile phone or a tablet. In this embodiment, mobile phone is used as an example for explanation. When the mobile phone and the control mainboard 3 are connected via the Bluetooth module, users can not only observe the data collected by the air pressure sensor through the mobile phone, but also send instructions to the control mainboard 3 through the mobile phone. For example, turn on or off the air pump 2 or set the threshold value of the tire pressure.

By arranging a Bluetooth module on the control mainboard 3, when using the air pump device provided in this embodiment to inflate the car tires, users do not need to squat next to the car to observe the inflation situation, and can move freely within the effective coverage area of the Bluetooth module. This not only greatly facilitates users' operations, but also significantly enhances safety, effectively avoids the adverse effects that potential safety risk may bring to users during inflation, and makes the inflation process more intelligent, safer and more convenient.

In one embodiment, the air pump device further includes function buttons 18 arranged on the surface of the case body 1. The control mainboard 3 is arranged below the function buttons 18. A plurality of sensor switches corresponding to the function buttons 18 one by one are arranged on the control mainboard 3.

The function buttons 18 may include an on/off button, a mode button, a selection button, a light switch, etc. By burning a specific program into the control mainboard 3, when users press the function button 18, corresponding sensor switch can be triggered to perform a corresponding task.

In one embodiment, the case body 1 includes a top case 11 and a bottom case 12. The top case 11 is provided with an observation window 111. The top case 11 and the bottom case 12 are connected to form an inner cavity provided with a display panel 31 inside. The display panel 31 is electrically connected to the control mainboard 3 and is located below the observation window 111.

Preferably, the display panel 31 may include a power display area, an air pressure value display area, a mode display area, an air pressure value setting display area and a unit display area. Users can directly observe the current state of the air pump device through the display panel 31.

In one embodiment, the pressure sensor can monitor the air pressure changes during the inflation process in real time to ensure the accuracy and safety of the inflation process.

In one embodiment, the case body 1 is provided with a charging port 14 and a discharge port 15. The charging port 14 and the discharge port 15 are both electrically connected to the control mainboard 3. The charging port 14 can be connected to an external power source through an external power cord to supply power to the power supply module 4 in the inner cavity of the case body 1. The discharge port 15 can also be connected to a terminal device through an external charging cable, so that the power supply module 4 can be used as a mobile power source to charge the terminal device.

In one embodiment, the air pump 2 includes a motor 21 and fan blades 22 which are connected to the output end of the motor 21. The fan blades 22 are driven by the motor 21 to rotate to dissipate heat, thereby avoiding the influence of the operation of the air pump 2 due to the excessively high temperature of the inner cavity and extending the service life of the air pump 2.

Preferably, the case body 1 is provided with vents 13, and the fan blades 22 are arranged adjacent to the vents 13 to facilitate the discharge of heat in the inner cavity.

In one embodiment, the inner cavity includes a first installment cavity 19 and a second installment cavity 191. The power supply module 4 is arranged in the first installment cavity 19. And the air pump 2 is arranged in the second installment cavity 191.

The inner cavity further includes a third installment cavity 192 provided with air pump accessories 23 inside. The second installment cavity 191 is arranged between the first installment cavity 191 and the third installment cavity 192.

Preferably, a storage box 24 is arranged on the outer periphery of the air pump accessories 23, and the storage box 24 is slidably arranged in the third installment cavity 192. A first opening 16 is arranged at one end of the third installment cavity 192, and the storage box 24 can be pulled out along the first opening 16, so that the air pump accessories 23 is exposed to the external environment, making it convenient for users to take out the air pump accessories 23.

Further, a second opening 17 is arranged at one end of the case body 1, and the air pump port 20 of the air pump 2 is exposed to the outer surface of the case body 1 along the second opening 17. Users can connect the air pump accessories 23 to the air pump port 20 of the air pump 2 to inflate.

In one embodiment, the air pump 2 may be any of the various air pumps known in the art. For example, it may include: a cylinder assembly, a piston assembly, a motor drive mechanism, a gear transmission mechanism, a cooling fan, etc.

In one embodiment, the air pump accessories 23 may be various air pump accessories known in the art. For example, the air pump accessories 23 may include: various air pump nozzles, air pump connection tubes, charging cables, etc. Through different combinations of the air pump 2 and the air pump accessories 23, different products such as balls, bicycles, motorcycles, or bicycle tires can be inflated.

It could be understood that under the guidance of the above embodiments, those skilled in the field can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the protection scope of the present invention.

What is claimed is:

1. An air pump device with Bluetooth function comprises a case body, wherein an air pump, a control mainboard, an air pressure sensor and a power supply module are arranged in the case body; and a Bluetooth module is arranged on the control mainboard; the air pump comprises a motor and fan blades connected to an output end of the motor.

2. The air pump device with Bluetooth function according to claim 1, wherein the air pump device also comprises function buttons arranged on a surface of the case body; the control mainboard is arranged below the function buttons; a plurality of sensor switches corresponding to the function buttons one by one are arranged on the control mainboard.

3. The air pump device with Bluetooth function according to claim 1, wherein the case body is provided with a charging port and a discharge port; the charging port and the discharge port are both electrically connected to the control mainboard.

4. The air pump device with Bluetooth function according to claim 1, wherein vents are arranged on the case body; and the fan blades are arranged adjacent to the vents.

5. The air pump device with Bluetooth function according to claim 1, wherein the case body comprises a top case and a bottom case; the top case is provided with an observation window; the top case and the bottom case are connected to form an inner cavity provided with a display panel inside; the display panel is electrically connected to the control mainboard and is located below the observation window.

6. The air pump device with Bluetooth function according to claim 5, wherein the inner cavity comprises a first installment cavity and a second installment cavity; the power supply module is arranged in the first installment cavity; and the air pump is arranged in the second installment cavity.

7. The air pump device with Bluetooth function according to claim 6, wherein the inner cavity also comprises a third installment cavity provided with air pump accessories inside; the second installment cavity is arranged between the first installment cavity and the third installment cavity.

8. The air pump device with Bluetooth function according to claim 7, wherein a storage box is arranged on an outer periphery of the air pump accessories; the storage box is slidably arranged in the third installment cavity; a first opening is arranged at one end of the third installment cavity; the storage box can be pulled out along the first opening.

9. The air pump device with Bluetooth function according to claim 1, wherein a second opening is arranged at one end of the case body; an air pump port of the air pump is exposed to an outer surface of the case body along the second opening.

* * * * *